(12) United States Patent
Klewer et al.

(10) Patent No.: US 8,845,187 B2
(45) Date of Patent: Sep. 30, 2014

(54) ZERO HEAT FLUX TEMPERATURE SENSING DEVICE

(75) Inventors: Jasper Klewer, Eindhoven (NL); Amy O. M. Cheung, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 226 days.

(21) Appl. No.: 13/202,627

(22) PCT Filed: Mar. 4, 2010

(86) PCT No.: PCT/IB2010/050938
§ 371 (c)(1),
(2), (4) Date: Aug. 22, 2011

(87) PCT Pub. No.: WO2010/103436
PCT Pub. Date: Sep. 16, 2010

(65) Prior Publication Data
US 2011/0317737 A1 Dec. 29, 2011

(30) Foreign Application Priority Data
Mar. 13, 2009 (EP) .................................... 09155065

(51) Int. Cl.
*G01K 17/00* (2006.01)
*G01K 3/00* (2006.01)
*G01K 7/00* (2006.01)
*G01N 25/00* (2006.01)
*G01K 13/00* (2006.01)
*G01K 1/16* (2006.01)

(52) U.S. Cl.
CPC ............... *G01K 1/16* (2013.01); *G01K 13/002* (2013.01); *G01K 1/165* (2013.01)
USPC ............. 374/29; 374/112; 374/166; 374/137; 374/15

(58) Field of Classification Search
USPC ............................. 374/29, 112, 166, 137, 15
See application file for complete search history.

(56) References Cited

U.S. PATENT DOCUMENTS 3,217,538 A * 11/1965 Loeb ................................ 374/29
3,720,103 A * 3/1973 Adams et al. .................... 374/29
(Continued)

FOREIGN PATENT DOCUMENTS

DE 2912498 A 2/1980
DE 3527942 A1 2/1987
(Continued)

OTHER PUBLICATIONS

Ducharme, M. B., et al.; The Effect of Wave Motion on Dry Suit Insulation and the Responses to Cold Water Immersion; 1998; Aviation, Space and Environmental Medicine; 69(10)957-964.

*Primary Examiner* — Mirellys Jagan (57) ABSTRACT

The invention relates to a zero heat flux temperature sensing device (100) for sensing a core body temperature of an object (113). The zero heat flux temperature sensing device (100) comprises a layer (107), a first temperature gradient sensor (105), a first heat flux modulator (103) and a heat flux modulator controller (102). The layer (107) has an opposing first side (112) and second side (108). In use the first side (112) is nearest to the object (113). The layer (107) is for obtaining a first temperature difference over the layer (107) in response to a first heat flux in a first direction from the first side (112) to the second side (108). The first temperature gradient sensor (105) senses at the first side (112) of the layer (107) a second temperature difference in a second direction. The second direction extends from a first border of the first side (112) towards a second border of the first side (112). The first heat flux modulator (103) is arranged at the first side (112) of the layer (107) and is constructed to change a second heat flux in a second direction at the first side (112) of the layer (107) in order to influence the second temperature difference. The heat flux modulator controller (102) controls the first heat flux modulator (103) on basis of the sensed second temperature difference in order to decrease an absolute value of the second temperature difference. The effect of the measures according to the invention is that the zero heat flux temperature sensing device (100) senses the core body temperature of the object (113) more accurately.

15 Claims, 5 Drawing Sheets

(56) References Cited

U.S. PATENT DOCUMENTS

| | | | |
|---|---|---|---|
| 4,247,756 A | 1/1981 | Cucinotta et al. | |
| 6,021,348 A | 2/2000 | James | |
| 6,220,750 B1 | 4/2001 | Palti | |
| 6,355,001 B1 | 3/2002 | Quinn et al. | |
| 7,249,883 B2 * | 7/2007 | Kuroda et al. | 374/110 |
| 2002/0003832 A1 | 1/2002 | Siefert | |
| 2002/0079310 A1 | 6/2002 | Siefert | |
| 2002/0150143 A1 | 10/2002 | Tokita et al. | |
| 2006/0047214 A1 * | 3/2006 | Fraden | 600/513 |
| 2007/0016271 A1 | 1/2007 | Hammond | |
| 2007/0038141 A1 | 2/2007 | Koch | |
| 2007/0282218 A1 * | 12/2007 | Yarden | 600/549 |
| 2009/0187115 A1 * | 7/2009 | Yarden et al. | 600/549 |
| 2009/0296733 A1 * | 12/2009 | Yu | 370/458 |
| 2010/0202488 A1 * | 8/2010 | Wijnen et al. | 374/134 |
| 2011/0096807 A1 * | 4/2011 | Wan et al. | 374/29 |
| 2011/0249701 A1 * | 10/2011 | Bieberich et al. | 374/163 |
| 2011/0264001 A1 * | 10/2011 | Cheung et al. | 600/549 |
| 2012/0024833 A1 * | 2/2012 | Klewer et al. | 219/211 |
| 2012/0106592 A1 * | 5/2012 | Klewer | 374/45 |

FOREIGN PATENT DOCUMENTS

| | | |
|---|---|---|
| DE | 29612037 U1 | 12/1996 |
| EP | 0399061 A1 | 11/1990 |
| EP | 1575010 A1 | 9/2005 |
| EP | 1788370 A1 | 5/2007 |
| GB | 2336514 A | 10/1999 |
| WO | 2004079316 A1 | 9/2004 |
| WO | 2008068665 A1 | 6/2008 |

* cited by examiner

ZERO HEAT FLUX TEMPERATURE SENSING DEVICE

FIELD OF THE INVENTION

The invention relates to a zero heat flux temperature sensing device for measuring the core body temperature of an object.

BACKGROUND OF THE INVENTION

Published patent application DE3527942A1 discloses a temperature sensing device for measuring the core body temperature of a person or an animal. One side of the sensing device has to be positioned against the skin of body of the person or the animal. Inside the device, in a dimension perpendicular to the contact area between the sensor and the skin of the body and in the direction away from the contact area, in the order mentioned, the temperature sensor comprises a first temperature sensor, a thermal insulator, a second temperature sensor and a heating element.

If the temperature sensing device is positioned against the skin of the body the first temperature sensor measures the skin temperature. Assuming a core body temperature higher than the ambient temperature, there will be a decreasing temperature gradient in the sensing device in the direction away from the contact area between the temperature sensing device and the skin: the further a specific position inside the temperature sensing device is away from the contact area, the lower the temperature at the specific position will be. Especially, the thermal insulator creates a significant step in this gradient. Consequently, the second temperature sensor will measure a lower temperature than the first temperature sensor. As a result of the decreasing temperature gradient a heat flux will be present through the temperature sensor in the direction away from the contact area.

Note that there will be a temperature gradient in the body of the person of the animal as well. The core of the body has a higher temperature than the skin. A heat flux is present from the core of the body towards the skin. Positioning the temperature sensing device against the skin of the body influences the temperature of the skin below the sensing device. The part of the skin below the sensing device will become warmer because of the local insulating effect of the temperature sensing device. As a consequence the heat flux in the body will decrease. There is still a heat flux through the temperature sensing device as the result of the temperature gradient in the device itself. The temperature sensing device will not act as a perfect insulator and as a consequence the skin temperature will still be lower than the core body temperature.

The measured temperature difference between the first temperature sensor and the second temperature sensor is a measure for the heat flux from the contact area toward the top of the temperature sensing device. This measured temperature difference is used to control the heating element. If the top of the sensor is heated, the temperature gradient inside the sensing device, created by the thermal insulation, partly disappears. As a consequence, the heat flux from the contact area between the temperature sensing device and the skin of the body towards the top of the sensing device reduces. As a consequence the skin of the body becomes warmer and closer to the core body temperature. The heating element will be heated until the measured temperature difference between the first temperature sensor and the second temperature sensor will become very small and substantially equal to zero.

If the temperature difference measured between the first and the second temperature sensor is zero, the heat flux inside the temperature sensing device will be zero as well. If there is no heat flux through the temperature sensing device, the heat flux from the body to the temperature sensing device will be close to zero as well. If there is no heat flux between the body and the temperature sensing device, it may be assumed that the temperature sensing device has the same temperature as the core of the body.

However, it is known that the temperature sensing device of the cited art is not accurate enough. Especially in a clinical setting it is important to sense the core body temperature accurately.

SUMMARY OF THE INVENTION

It is an object of the invention to provide a zero heat flux temperature sensing device that measures the core body temperature of an object more accurately.

A first aspect of the invention provides a zero heat flux temperature sensing device as claimed in claim 1. A second aspect of the invention provide a body temperature sensing apparatus as claimed in claim 15.

A zero heat flux temperature sensing device according to the first aspect of the invention is a sensing device for sensing the core body temperature of an object. The zero heat flux temperature sensing device comprises a layer that has a first side and a second side. In use, the first side is nearest to the object. The second side of the layer is arranged opposite the first side. In use, the layer is for obtaining a first temperature difference over the layer in response to a first heat flux in a first direction from the first side to the second side.

The zero heat flux sensing device further comprises a first gradient sensor to sense at the first side of the layer a second temperature different in a second direction. The second direction extends from a first border of the first side to the second border of the first side of the layer.

The zero heat flux sensing device further comprises a first heat flux modulator arranged at the first side of the layer. The heat flux modulator is constructed for changing a second heat flux in the second direction at the first side of the layer. Changing the second heat flux results in influencing the second temperature difference.

The zero heat flux sensing device further comprises a heat flux modulator controller for controlling the first heat flux modulator in dependence of the sensed second temperature difference. The heat flux modulator controller controls the first heat flux modulator such that the absolute value of the second temperature difference decreases.

The zero heat flux temperature sensing device has a temperature gradient below the layer in the lateral direction as the result of heat losses at the extreme points of the contact area between the temperature sensing device and the surface of the object. Another reason for the temperature gradient at the first side the layer is the temperature gradient in the lateral direction in top layer of the object of which the core body temperature is measured. Inside the object a heat flux is present in the lateral direction away from the area where the object is in contact the temperature sensing device. A temperature gradient below the layer influences the accuracy of the temperature device in a negative way. If there is still a heat flux as a result of a temperature gradient, the temperature at the first side of the layer does still not represent the core body temperature exactly. The assumption that the temperature of the temperature sensing device is equal to the core body temperature is false under such conditions. Furthermore, the temperature sensor that is used for measuring the temperature at the specific location at the first side of the layer has a size larger than zero. If there is a temperature gradient at the first side the temperature sensor is subject to this gradient as well and measures a temperature that is between the hottest point of the sensor and the coldest point of the sensor.

The temperature gradient sensor according to the first aspect of the invention measures whether there is a uniform temperature at the first side of the layer or whether there is a temperature difference. If there is a temperature gradient in the lateral direction at the first side of the layer, there is a heat flux from the higher temperature in the direction of the lower temperature. The heat flux modulator is able to influence the heat flux by adding or extracting heat. If the temperature gradient is decreasing in the direction of the heat flow modulator, the heat flux modulator adds heat and as a result the absolute temperature difference becomes smaller or substantially equal to zero. If the temperature gradient is increasing in the direction of the heat flux modulator, the heat flux modulator extracts heat in order to get a smaller absolute temperature difference or to get an absolute temperature difference substantially equal to zero.

If the temperature distribution below the layer in the lateral direction becomes more uniform, the heat flux in the lateral direction is smaller. This results in the fact that the temperature at the first side of the layer is at least more equal to the core body temperature. Furthermore, every temperature sensor that is positioned at the first side of the layer is subject to the smaller temperature difference inside the temperature sensor and consequently measures more accurately the temperature. Thus, the accuracy of the measurement of the core body temperature increases by influencing the temperature distribution at the first side of the layer such that the distribution becomes more uniform.

It should be noted that the first heat flux modulator may be heater, a cooler or a combination of a heater and a cooler.

The first side of the layer is a plane with finite dimensions. The locations where the plane ends are called a border. Other descriptions for the border of the first side are an edge of the first side, an extreme location of the first side, or a terminus of the first side. The second direction extends from a first border to a second border. It means that the second direction follows approximately the direction of the plane of the first side and may be approximately parallel to the plane of the first side. However, the first side may be curved if the zero heat flux temperature sensing device is brought in contact with a curved surface of the object. The second direction may follow the curved surface or the second direction follows a line that is extending from a first border of the first side towards a second border of the first side.

By way of abbreviation, the "layer for obtaining a first temperature difference over the layer in response to a first heat flux" is called a thermal insulator in the continuation of this part of this document. Although the layer is not a thermal insulator in the sense of "prevent any heat flowing through the layer", it is called an insulator because the layer is for obtaining a first temperature difference over the layer in response to the first heat flux. If a heat flux flows through a material that conducts heat very well, no temperature difference will be present between a first side of the material and the second side of the material. Thus, the layer has partly the characteristics of an insulator and partly allows a heat flux through the layer.

In an embodiment, the zero heat flux sensing device further comprises a second gradient sensor for sensing a second temperature gradient, more specifically a second temperature difference, in the first direction. The zero heat flux sensing device further comprises a second heat flux modulator arranged at the second side of the thermal insulator. The second heat flux modulator is constructed to influence the first heat flux such that the first heat flux changes and consequently the second temperature difference. The heat flux modulator controller is further constructed to control the second heat flux modulator by using the sensed second temperature different. The heat flux modulator is controlled such that the absolute value of the sensed second temperature difference decreases.

In another embodiment the zero heat flux modulator has a further thermal insulator positioned at the second side of the thermal insulator. The second heat flux modulator is positioned between, and sandwiched between the thermal insulator and the further thermal insulator. It is advantageous to have a further thermal insulator for increasing the efficiency of the zero heat flux modulator. The second heat flux modulator has to add or extract heat such that the first heat flux in the first direction is influenced, and it is inefficient if the second heat flux modulator adds or extracts heat to or from the ambient of the zero heat flux temperature sensing device.

In another embodiment, the first temperature gradient sensor of the zero heat flux sensing device comprises a first temperature sensor and a second temperature sensor. The first temperature sensor and the second temperature sensor are positioned at the first side of the thermal insulator and measure the temperature at a first position and a second position. The first position and second position are displaced in the second direction. The second temperature sensor is positioned between the first temperature sensor and the first heat flux modulator.

Using two temperature sensors to measure a temperature difference is a very effective and efficient way of sensing a temperature difference. The heat flux modulator controller controls the heat flux modulator in order to decrease the absolute value of the first temperature difference. This requires a feedback loop in which the effect of controlling the heat flux modulator is measurable by the first temperature gradient sensor. The first temperature gradient sensor is most capable of measuring the influence of changes in the first temperature difference as the result of changes in the second heat flux if the second temperature sensor is positioned in between the first temperature sensor and the first heat flux modulator.

In a further embodiment, the heat flux controller instructs the first heat flux modulator to add heat if the second temperature sensor measures a lower temperature than the first temperature sensor, or the heat flux controller instructs the first heat flux modulator to extract heat if the second temperature sensor measures a higher temperature than the first temperature sensor. If the temperature at a first position of the first temperature sensor is higher than the temperature at a second position of the second temperature sensor, the second heat flux approximately follows the line from the first position to the second position. This means that the second heat flux flows towards the first heat flux modulator as well. In this case, it is advantageous to add heat at the position of the first heat flux modulator, which results in the direct neighborhood of the first heat flux modulator in a heat flux away from the first heat flux modulator. This local heat flux transports heat in the direction of the second temperature sensor and consequently the temperature at the second position increases. Thus, adding heat in this situation results in a lower absolute value of the first temperature difference measured by the first temperature gradient sensor. Thus, there are less lateral heat losses and the temperature sensing device senses more accurately.

In another embodiment the zero heat flux temperature sensing device has a third temperature sensor. The third temperature sensor is positioned at the second side of the thermal insulator and senses the temperature at the second side of the thermal insulator. The second temperature gradient sensor uses the third temperature sensor in combination with one of the first temperature sensor or second temperature sensor to sense the second temperature difference.

The second temperature gradient sensor has to measure a second temperature difference in the first direction. The difference between the temperature at the first side and the temperature at the second side is therefore a second temperature difference. The temperature at the first side is represented by the temperature sensed by the first temperature sensor, or it is represented by the temperature sensed by the second temperature sensor, or by a combined value of the sensed temperatures by the first temperature sensor and the second temperature sensor. The temperature at the second side is represented by the temperature sensed by the third temperature sensor. It is advantageously to use the first temperature sensor and second temperature sensors in the first temperature gradient sensor as well as in the second temperature gradient sensor. It is an efficient use of the temperature sensors in the zero heat flux temperature sensing device.

In an embodiment, the first heat flux modulator is positioned at one of the borders of the first side of the thermal insulator As discussed before the first temperature difference is the result of lateral heat losses at the border of the contact area between the temperature sensing device and the surface of the object. If the first heat flux modulator is positioned at one or more of these borders, the lost heat is not the result of the second heat flux flowing in the lateral direction, but is the result of heat generated by the first heat flux modulator. The heat flux modulator functions at these locations with respect to the second heat flux as an insulator. It results in a smaller first temperature difference at the first side of the thermal insulator. In a practical embodiment, it is advantageous to have the first heat flux modulator arranged along the whole border of the first side of the thermal insulator. This completely prevents heat losses in the lateral direction.

In another embodiment, the thermal insulator has one or more specific properties.

A first specific property is that the thermal conductivity of the thermal insulator does not deviate more than a factor 10 from the thermal conductivity of the top layer of the object. The maximum deviation factor of 10 is advantageous because the transition of a material with a first thermal conductivity to a material with a second different thermal conductivity results in thermal fluxes that bend in the neighborhood of or at the transition. For example, if a thermal flux flows into the direction of a material with a very low thermal conductivity, the thermal flux bends to the left or the right in the layer just before it reaches the material with the very low thermal conductivity. A heat flux that bends into the lateral direction contributes to unwanted lateral heat losses and inaccurate temperature measurements. If the first thermal conductivity is in the same order as the second thermal conductivity, the direction of the heat fluxes is not much influenced by the transition from a first conductivity to a second conductivity. This is advantageous in a zero heat flux temperature sensing device, because the accuracy of the temperature measurement depends a lot on the path followed by the heat flux in the top layer of the object.

A second specific property is that the thermal conductivity of the thermal insulator is lower than the thermal conductivity of the top layer of the object. For an accurate measurement it is advantageous if the first side of the thermal insulator is heated by the object as a result of heat flowing from the core of the body of the object to the first side of the thermal insulator and it is not advantageous if this heat flows subsequently to the second side of the thermal insulator. Thus, if the thermal conductivity of the thermal insulator is lower than the thermal conductivity of the top layer of the object, more heat flows from the core of the body of the object to the first side than the amount of heat that flows subsequently to the second side of the thermal insulator.

A third specific property is that the thermal insulator is of a flexible material. The objects of which the core body temperature is sensed do not always have a flat surface. For example, the zero heat flux temperature sensing device may be used to sense the core body temperature of the head of a person, which is slightly curved. Therefore, it is advantageous to have a thermal insulator of a flexible material such that the zero heat flux temperature sensing device follows the surface of the object when the zero heat flux temperature sensing device is brought in contact with the object. A good contact is required for an accurate core body temperature measurement. If the zero heat flux temperature sensing device is not very well in contact with the surface of the object, too much heat may be lost in lateral direction.

A fourth specific property is that the thermal insulator is constructed such that it does not absorb fluids. The zero heat flux temperature measurement device is used for example to measure the core body temperature of a person. The person may sweat because of a relative high ambient temperature, and it is expected that skin of the person at the location where the zero heat flux temperature sensor is brought in contact with the skin starts to sweat. If the material absorbs fluids, the thermal conductivity of the thermal insulator increases enormously. As discussed before, a too high thermal conductivity of the thermal insulator results in an inaccurate core body temperature measurement.

In a practical embodiment the material of the thermal insulator is neoprene (polychloroprene). Neoprene fulfills all four conditions if the zero heat flux temperature sensing device is used to measure the core body temperature of a human person. Other examples of practical materials are Ethylene Propylene Diene Monomer (EPDM) rubber, polyvinylidene fluoride (PVDF), polyethylene (PE), polypropylene (PP), methylacrylate (EMA), ethylenevinylacetate (EVA) and polyolefin.

In an embodiment, the zero heat flux temperature sensing device comprises at the first side of the thermal insulator a temperature sensor to measure the temperature at the first side of the thermal insulator. The temperature sensed by the temperature sensor may represent the core body temperature of the object if some conditions are fulfilled. The zero heat flux temperature sensing device comprises a deciding means to decide whether the sensed temperature reliably represents the core body temperature. In a specific embodiment only one of the subsequent conditions needs to be fulfilled, in another specific embodiment both of the subsequent conditions need to be fulfilled.

The first condition is that the currently sensed temperature by the temperature sensor does not deviate more than a predefined first threshold value from the average of a predefined number of previously precedingly sensed temperatures. If this condition is fulfilled, the sensed temperature may be considered to be stable, which is an indication for reaching a thermal equilibrium between the object and the zero heat flux temperature sensor. If a thermal equilibrium is obtained the senses temperature is a reliable representation of the core body temperature. In a practical embodiment the first threshold value is $10^{-1}$.

The second condition is that the absolute value of the second temperature difference sensed by the second temperature gradient sensor is smaller than a second threshold value. If the absolute value of the second temperature difference is small enough, the first heat flux is small as well. If the first heat flux is small, the temperature a the first side of the thermal insulator is close to the core body temperature of the body of the object. In a practical embodiment the second threshold value is $10^{-1}$.

In a further embodiment the zero heat flux temperature sensing device further comprises a means to provide feedback to the user whether the sensed temperature at the first side of the thermal insulator is a reliable representation of the core body temperature of the object. Users of the zero heat flux temperature sensing device are often medical experts who require reliable temperature information of a person to decide about a treatment of the person. Basing decisions on a temperature that is unreliable is undesirable and possibly dangerous. Therefore, it is advantageous to provide the users feedback about the reliability of the sensed core body temperature in order to prevent undesirable or dangerous situations.

In an embodiment, the zero heat flux temperature sensing device further comprises a thermal mass detector. The thermal mass detector is for detecting the presence of a thermal mass at the first side of the thermal insulator. The thermal mass is detected on basis of a sensed thermal resistance at the first side of the thermal insulator. The thermal mass detector decides that the thermal mass is present if the sensed thermal resistance is higher than a predefined threshold thermal resistance. The thermal resistance is sensed by controlling the first heat flux modulator on basis of a modulation signal in order to obtain a modulated second heat flux and by analyzing the sensed temperature by the first temperature sensor and/or the second temperature sensor. The sensed temperature of the first temperature sensor and/or the second temperature sensor is analyzed to estimated the thermal resistance between the first heat flux modulator and the first temperature sensor and/or the second temperature sensor on basis of the transfer of the modulation signal to the sensed temperature of the first temperature sensor and/or the second temperature sensor.

The thermal mass is, for example, the object of which the core body temperature is measured. If the thermal mass is present, the zero heat flux temperature sensing device may be operated to sense the core body temperature. The thermal mass detector may inform the heat flux controller that the zero heat flux sensing device is 'in use' such that the heat flux controller may perform its operations. In the case of an absence of the thermal mass the thermal mass detector may instruct several parts of the zero heat flux temperature sensing device to enter a standby state. Therefore, the thermal mass detector may be used to automate the operation of the zero heat flux temperature sensing device.

In a further embodiment, the zero heat flux temperature sensing device further comprises a means for providing feedback to the user about the presence of a thermal mass at the first side of the thermal insulator.

The accurate functioning of the zero heat flux temperature sensing device depends also on the right use of the sensing device. If the sensing device is not well attached to the skin of a person, the zero heat flux sensing device does not accurately sense the core body temperature. It is advantageous to inform the user of the sensing device about the detected absence in order to warn the user for an inaccurate use of the sensor. Furthermore, in for example a medical setting in which the core body temperature of a patient is remotely monitored, it is advantageous that the medical expert, who is located at another location than the patient, receives information about a correct contact between the zero heat flux temperature sensing device and the skin of the patient.

In an embodiment, the zero heat flux temperature sensing device further comprises a first heat flux modulator temperature sensor. The first heat flux modulator temperature sensor is arranged adjacent to the first heat flux modulator. The zero heat flux temperature sensing device further comprises a safety means. The safety means prevents that a part of the zero heat flux temperature sensing device becomes warmer than a first safety temperature and prevents that a part of the zero heat flux temperature sensing device becomes colder than a predefined second safety temperature. The safety means reduces the addition of heat by the first heat flux modulator if the sensed temperature of the first heat flux modulator is higher than the first safety temperature or the safety means reduces the extraction of heat by the first heat flux modulator if the sensed temperature of the first heat flux modulator is lower than the second safety temperature.

If the zero heat flux temperature sensing device is used to measure the core body temperature of an animal or of a human being, the sensing device has to be brought in contact with the skin of the animal or the human being. The skin may be damaged if the sensing device becomes too hot or too cool. The damage may even be larger if the sensing device is too hot or too cool for a longer period. It is desirable to have means to prevent such too high or too low temperatures of parts of the zero heat flux temperature sensing device. The zero heat flux temperature sensing device has an active component that adds heat or extracts heat, namely the first heat flux modulator. By preventing overheating of the first heat flux modulator above the first safety temperature and by preventing the first heat flux modulator becoming colder than the second safety temperature, parts of zero heat flux temperature sensing device do not become too warm or too cold.

In a further embodiment a second heat flux modulator temperature sensor is arranged adjacent to the second heat flux modulator. The second heat flux modulator temperature sensor senses the temperature of the second heat flux modulator. The safety means is further constructed for reducing the addition of heat by the second heat flux modulator if the sensed temperature of the second heat flux modulator is higher than the first safety temperature. The safety means if further constructed to reduce the extraction of heat by the second heat flux modulator if the sensed temperature of the second heat flux modulator is lower than the second safety temperature.

The second heat flux modulator is a second active thermal component in the zero heat flux temperature sensing device. Therefore, it is safer if the second heat flux modulator is accompanied by a second heat flux modulator temperature sensor such that the safety means may reduce the addition or the extraction of heat if the second heat flux modulator becomes too hot or too cold, respectively. This prevents the unwanted effect of damages to the skin of the animals or human being of which the core body temperature is sensed.

In another embodiment the safety means of the zero heat flux temperature sensing device is further constructed to analyze the power consumption of the first heat flux modulator. The safety means is further constructed to reduce the power provided to the first heat flux modulator if the power consumption exceeds a predefined power safety threshold.

The power used by the first heat flux modulator is a measure for the amount of heat that is added to the zero heat flux temperature sensing device or for the amount of heat that is extracted from the zero heat flux temperature sensing device. Too much power use is a sign that the zero heat flux temperature sensing device may become too hot or too cold. In cases that too much power is used, it is desirable to reduce the power use such that temperature problems are prevented. Furthermore, it is likely that the first heat flux modulator operates on electrical energy. Using electrical energy includes the risk of a short-circuit inside the sensing device or a short-circuit via the object of which the core body temperature is sensed. Especially, a short-circuit via the body of an animal or human being is dangerous for the animal or the human being. Short-circuits may be detected by detecting a too high power use of the first heat flux modulator. In a practical embodiment the safety means further analyses the power consumption of the second heat flux modulator and reduces the power provided to the second heat flux modulator if a safety threshold is exceeded.

According to the second aspect of the invention a body temperature sensing apparatus is provided to measure the core body temperature of an animal or of a human being. The body temperature sensing apparatus comprises a zero heat flux temperature sensing device according to the first aspect of the invention.

These and other aspects of the invention are apparent from and will be elucidated with reference to the embodiments described hereinafter.

It should be noted that items which have the same reference numbers in different figures, have the same structural features and the same functions, or are the same signals. Where the function and/or structure of such an item has been explained, there is no necessity for repeated explanation thereof in the detailed description.

The figures are purely diagrammatic and not drawn to scale. Particularly for clarity, some dimensions are exaggerated strongly.

DETAILED DESCRIPTION

Figure 1:
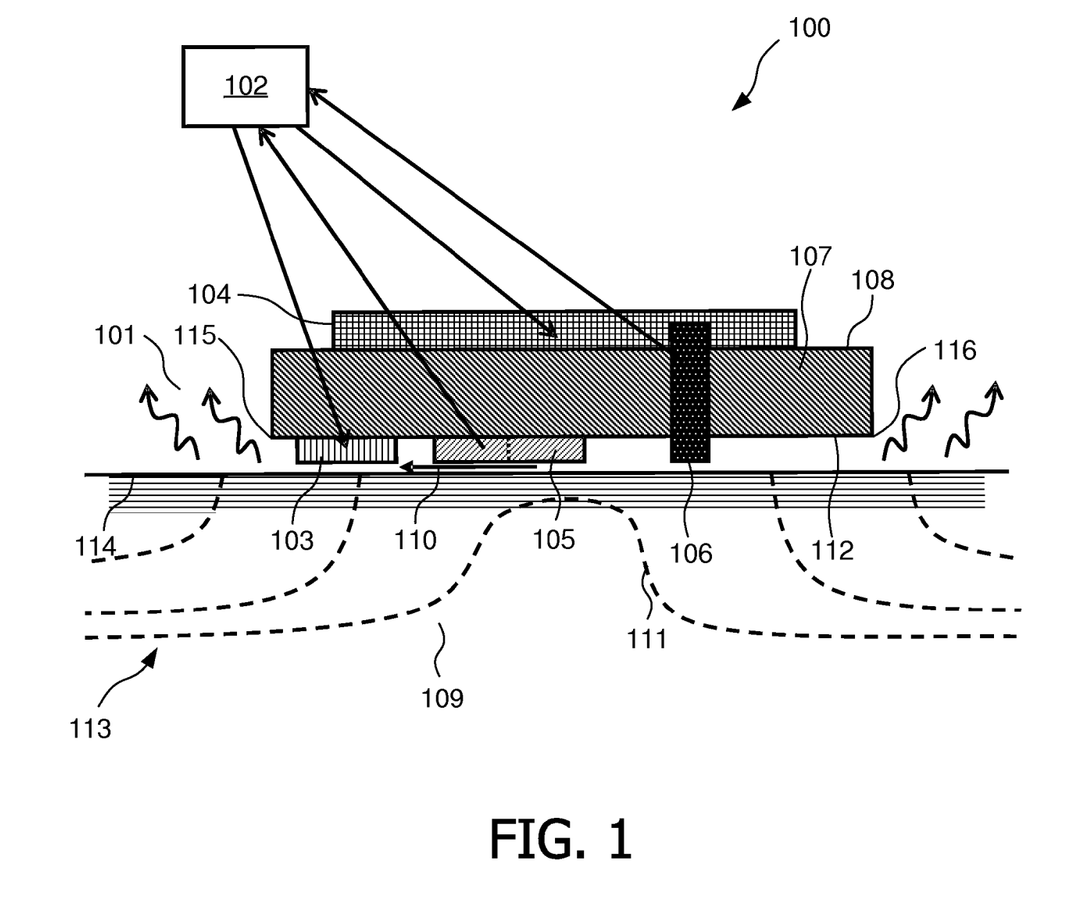
FIG. 1 schematically shows a cross-cut of a first embodiment a zero heat flux temperature sensing device placed against an object, FIG. 2 schematically shows a cross-cut of a second embodiment of the zero heat flux temperature sensing device, FIG. 3a schematically shows a cross-cut of a third embodiment of the zero heat flux temperature sensing device, FIG. 3b schematically shows the third embodiment of the zero heat flux temperature sensing device seen from the first side, FIG. 4a schematically shows a cross-cut of a fourth embodiment of the zero heat flux temperature sensing device, FIG. 4b schematically shows the fourth embodiment seen from the first side, and FIG. 5 schematically shows a fifth embodiment of the zero heat flux temperature sensing device comprising a means for providing feedback to the user.

A first embodiment is shown in FIG. 1. FIG. 1 shows a cross-cut of the first embodiment of the zero heat flux temperature sensing device 100 which is positioned against the surface 114 of an object 113. The zero heat flux temperature sensing device 100 senses the core body temperature of the core body 109 of the object 113. In the body 113 dashed temperature lines 111 are drawn that represent a specific temperature. The zero heat flux temperature sensing device 100 comprises a layer 107 to obtain a first temperature difference over the layer in response to a first heat flux. A first side 112 of the layer 107 is nearest to the surface 114 of the object 113. The zero heat flux temperature sensing device 100 is provided with a first heat flux modulator 103 and a first temperature gradient sensor 105 at the first side 112. The first temperature gradient sensor 105 is connected to the heat flux modulator controller 102. The heat flux modulator controller 102 is connected to the first heat flux modulator 103. The zero heat flux temperature sensing device 100 further comprises a second temperature gradient sensor 106 and a second heat flux modulator 104. The second heat flux modulator is positioned at a second side 108 of the thermal insulator 107. The second side 108 is the opposite side of the first side 112 of the layer 107. The heat flux modulator controller 102 is connected to the second heat flux modulator 104 and second temperature gradient sensor.

By way of abbreviation, the "layer for obtaining a first temperature difference over the layer in response to a first heat flux" 107 is called a thermal insulator in the continuation of this part of this document. Although the layer 107 is not a thermal insulator in the sense of "prevent any heat flowing through the layer", it is called an insulator because the layer 107 is for obtaining the first temperature difference over the layer 107 in response to the first heat flux. If a heat flux flows through a heat conductor, no temperature difference is present between a first side of the material and the second side of the material. Thus, the layer 107 has partly the characteristics of an insulator and partly allows a heat flux through the layer 107.

As drawn in FIG. 1 the object 113 radiates heat 101. As a consequence of this radiated heat the temperature of the top layers of the object 113 is lower than the core body temperature. If the zero heat flux temperature sensing device 100 is brought in contact with the object 113, the temperature in the top layers of the object 113 rises to a level close to the temperature of the core body 109 of the object 113. Thus, the temperature at the first side 112 of the thermal insulator 107 is close to the temperature of the core body 109 of the object 113. The second side 108 of the thermal insulator 107 has initially the temperature of the ambient, which is different from the temperature at the first side 112. The first temperature difference is the temperature difference between the first side 112 and the second side 108 of the thermal insulator 107 and causes a first heat flux in a first direction from the first side 112 to the second side 108 of the thermal insulator 107. As a result of the first heat flux the temperature at the first side 112 does not become closer to the temperature of the core body 109 of the object 113. The first temperature difference between the first side 112 and the second side 108 is measured by the second temperature gradient sensor 106. In response to the measured first temperature difference, the heat flux modulator controller 102 controls the second heat flux modulator 104 such that absolute value of the first temperature difference decreases. If the absolute value of the first temperature difference decreases, the first heat flux transports less heat and the temperature at the first side 112 of the thermal insulator 107 becomes closer to the temperature of the core body 109 of the object 113.

However, as drawn by the temperature lines 111 there is still a temperature gradient in the top layer of the body 113. The temperature gradient is caused by heat losses at the surface 114 of the body 113 outside the contact area between the zero heat flux temperature sensing device 100 and the body 113, and is causes by heat losses at the first border 115 of the second border 116 of the first side 112 of the thermal insulator 107. In practical use a thin opening is present between the zero heat flux temperature sensing device 100 and the body 113 and through this thin opening heat is released. Thus, in a second direction, as indicated by the arrow 110, there is a second temperature difference between a location in the middle of the first side 112 of the thermal insulator 107 and the first border 115 of the first side 112 of the thermal insulator 107. A temperature gradient will be present between the center of the first side 112 and the second border 116 of the first side 112.

The second temperature difference contributes to the inaccuracy of the core body temperature measurement. The first temperature gradient sensor 105 measures the second temperature difference in the second direction 110. The heat flux modulator controller 102 receives from the first temperature gradient sensor 105 the value of the second temperature difference and uses this value to control the first heat flux modulator 103. If the temperature is lower at a location closer to the first heat flux modulator 103 than at a location more far away from the first heat flux modulator 103, the first heat flux modulator 103 has to add heat. The instructions for the addition of heat are provided by the heat flux modulator controller 102. If the first heat flux modulator 103 adds heat, the second temperature difference decreases. Consequently, the temperature distribution at the first side 112 and in the top layer of the object 113 below the contact area with the zero heat flux temperature sensing device becomes more uniform and closer to, if not equal to, the temperature of the core body 109 of the object 113. Thus, the accuracy of the zero heat flux temperature sensing device 100 is increased.

It should be noted that the ambient may be warmer than the temperature of the core body 109 of the object 113. In such a situation the first heat flux modulator 103 and the second heat flux modulator 104 have too extract heat to reduce the second temperature difference and the first temperature difference, respectively. The first heat flux modulator 103 and the second heat flux modulator 104 may comprise a heating element, a cooling element or a cooling and a heating element.

The material of the thermal insulator 107 is neoprene. The thermal conductivity of neoprene is about 0.3 W/mK. This thermal conductivity results in an accurate measurement of the core body temperature of a human person. The thermal conductivity of the skin of a human person is 0.6 W/mK. Using a thermal insulator 107 with a thermal conductivity that is in the same order as, but lower than, the thermal conductivity of the top layer 114 of the object 113, results in an accurate core body temperature measurement. Neoprene has other advantages as well since it is a soft, flexible and stretchable material. The zero heat flux temperature sensing device 100 may be used to measure the core body temperature of an object 113 with a curved surface. If the thermal insulator 107 is of a soft material, the zero heat flux temperature sensing device 100 may follow the shape of the surface of the object 113. Furthermore, neoprene is a so-called closed-cell material, which means that a fluid cannot enter the gas filled cells of the material. Neoprene does not absorb fluids, which is advantageous because an absorbed fluids may cause a thermal short-cut in the thermal insulator. In other embodiments, the thermal insulator 107 is of Ethylene Propylene Diene Monomer (EPDM), or of polyvinylidene fluoride (PVDF), polyethylene (PE), polypropylene (PP), methylacrylate (EMA), ethylenevinylacetate (EVA) and polyolefin.

In an embodiment of the heat flux modulator controller 102, a PI controller is used. The subsequent formula represents the PI control loop for controlling the first heat flux modulator:

$$H_{hfm1}(t)=H_{hfm1}(t-1)+K_i*TD_2(t)+K_p*dTD_2(t)$$

wherein $H_{hfm1}(t)$ is the heat to be added or extracted by the first heat flux modulator 103 at time t, $K_i$ is a first parameter of the PI controller, $K_p$ is a second parameter of the PI controller, $TD_2(t)$ the second temperature difference at time t, and $dTD_2(t)=TD_2(t)-TD_2(t-1)$ It should be noted that in other embodiments of the heat flux modulator controller 102 another type of controller may be used, like for example a PID controller, or a controller having artificial intelligence.

As indicated before, the object 113 of which the core body temperature is measured by the zero heat flux temperature sensing device 100 may be the body of an animal or a human being. However, the use of the zero heat flux temperature sensing device 100 is not limited to living beings. It may be used for measuring the core body temperature of static objects as well, as long as there is a heat flux from the core body 109 of the object 113 to the surface 114 of the object 113, or a heat flux in the reverse direction.

Figure 2:
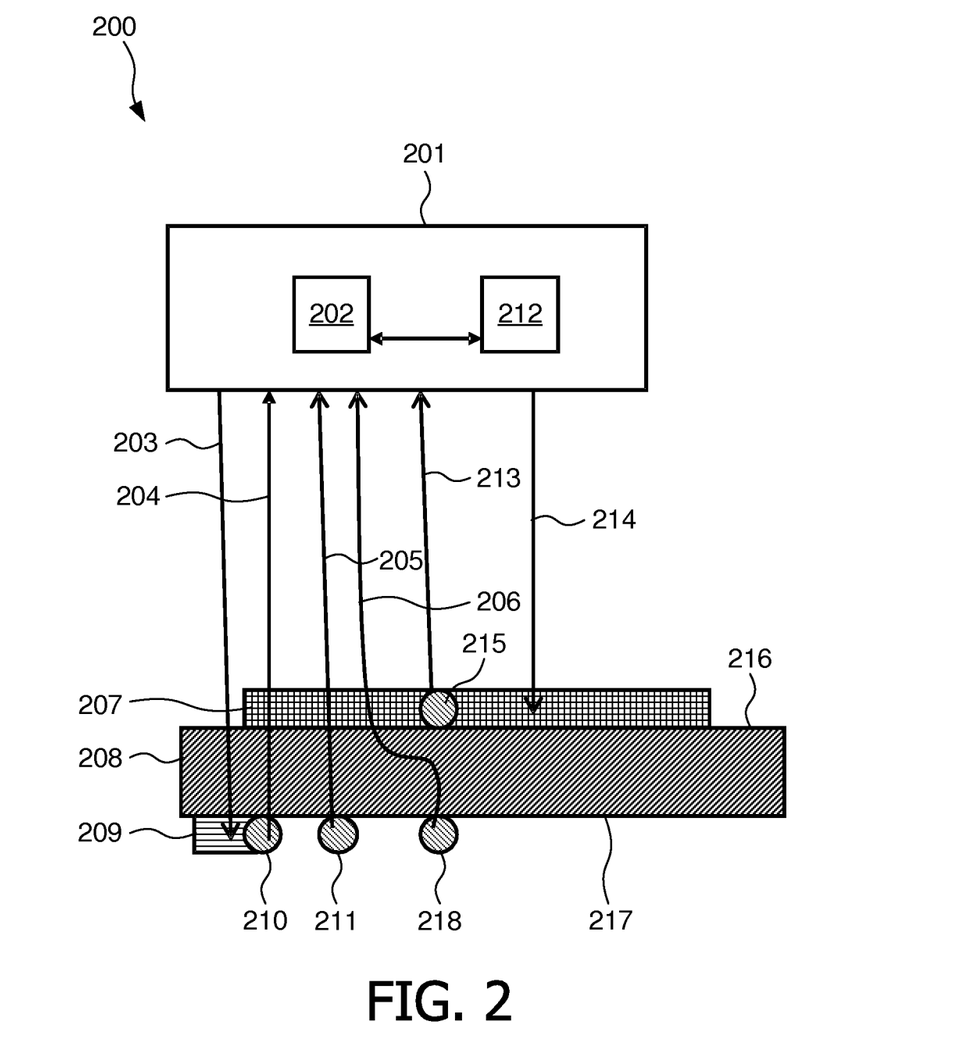

FIG. 2 shows another embodiment of a zero heat flux temperature sensing device 200. The zero heat flux temperature sensing device 200 comprises a thermal insulator 208. At the first side 216 of the thermal insulator 208 are located: a first heat flux modulator 209, a first temperature sensor 218, a second temperature sensor 211 and a first heat flux modulator temperature sensor 210. The first heat flux modulator temperature sensor 210 is positioned in the direct neighborhood of, or adjacent to, the first heat flux modulator 209. At the second side of the thermal insulator 208 are positioned a third temperature sensor 215 and a second heat flux modulator 207. The zero heat flux temperature sensing device 200 further comprises a general control unit 201. The general control unit 201 has a heat flux modulator controller 202 and a safety means 212.

The first temperature sensor 218 measures the temperature at a first location close to the center of the first side 217 of the thermal insulator 208. The second temperature sensor 211 measures the temperature at a second location in between the first heat flux modulator 209 and the first temperature sensor 218. The first temperature sensor 211 and the second temperature sensor 211 are connected to the general control unit 201 and send the signals 206 and 205, respectively, to the general control unit 201. The signals 205 and 206 comprise information about the sensed temperatures. Based on the temperature difference between the first temperature sensor 218 and the second temperature sensor 211 the heat flux modulator controller 202 generates a signal 203 to control the first heat flux modulator 209. If the temperature measured at the second temperature sensor 211 is higher than the temperature measured at the first temperature sensor 218, a signal 203 is generated which instructs the first heat flux modulator 209 to extract heat.

The first heat flux modulator temperature sensor 210 measures the temperature at the position of the first heat flux modulator 209. This temperature is submitted as a signal 204 to the general control unit 201. The safety means 212 checks whether the temperature, which is measured by the first heat flux modulator temperature sensor 210, is higher than a first predefined safety threshold, or lower than a second predefined safety threshold. If the condition is fulfilled the safety means 212 instructs the first heat flux modulator 209 in cooperation with the heat flux modulator controller 202 to reduce the addition or extraction of heat, respectively. If, for example, the temperature of the first heat flux modulator 209 is higher than the first safety threshold, the signal 203 which controls the first heat flux modulator 209 instructs the first heat flux modulator 209 to decrease the addition of heat.

The third temperature sensor 215 senses the temperature at the second side 216 of the thermal insulator 208. In the embodiment of FIG. 2 the third temperature sensor 215 is in contact with the second heat flux modulator 207. A signal 213 is received by the general control unit 201 from the third temperature sensor 215. The signal 213 represents the measured temperature at the second side 216 of the thermal insulator 208. The temperature difference between the third temperature sensor 215 and the first temperature sensor 218 may be used by the heat flux modulator controller 202 to control the second heat flux modulator 207. A signal 214 is provided to the second heat flux modulator 207 by the central control unit 201.

In another embodiment the temperature difference between the third temperature sensor 215 and the second temperature sensor 211 is used to control the second heat flux modulator 207. In yet another embodiment the average temperature of the temperatures measured by the first temperature sensor 218 and the second temperature sensor 211 minus the temperature measured by the third temperature sensor 215 is used to control the second heat flux modulator 207.

The third temperature sensor 215 is positioned adjacent to the second heat flux modulator 207. Therefore, the safety means 212 uses the temperature sensed by the third temperature sensor 218 to check whether the second heat flux modulator 207 is too warm or too cold. If the sensed temperature is outside a safety range, the safety means interferes with the controlling of the second heat flux modulator 207 to reduce the addition or the extraction of heat by the second heat flux modulator 207.

Figure 3A:
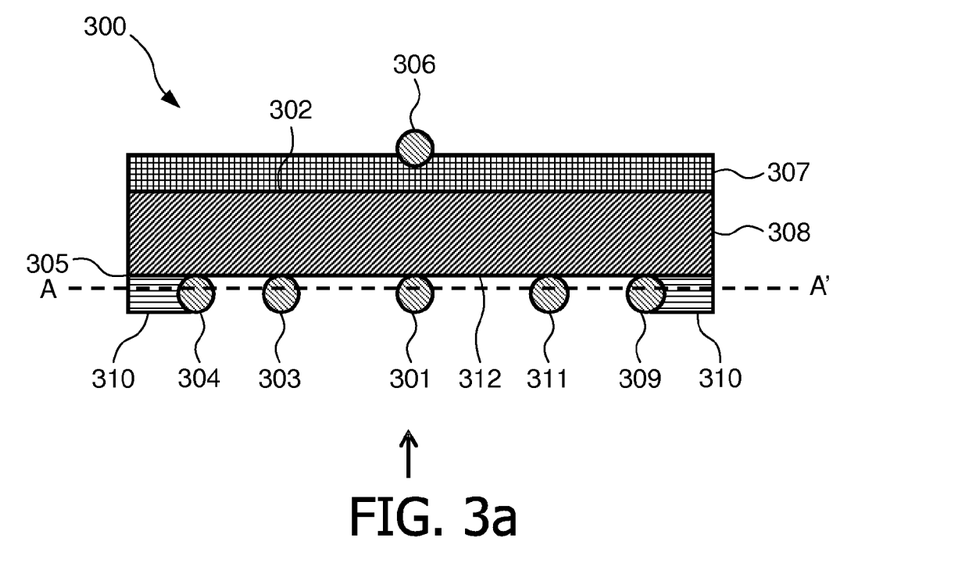
Figure 3B:
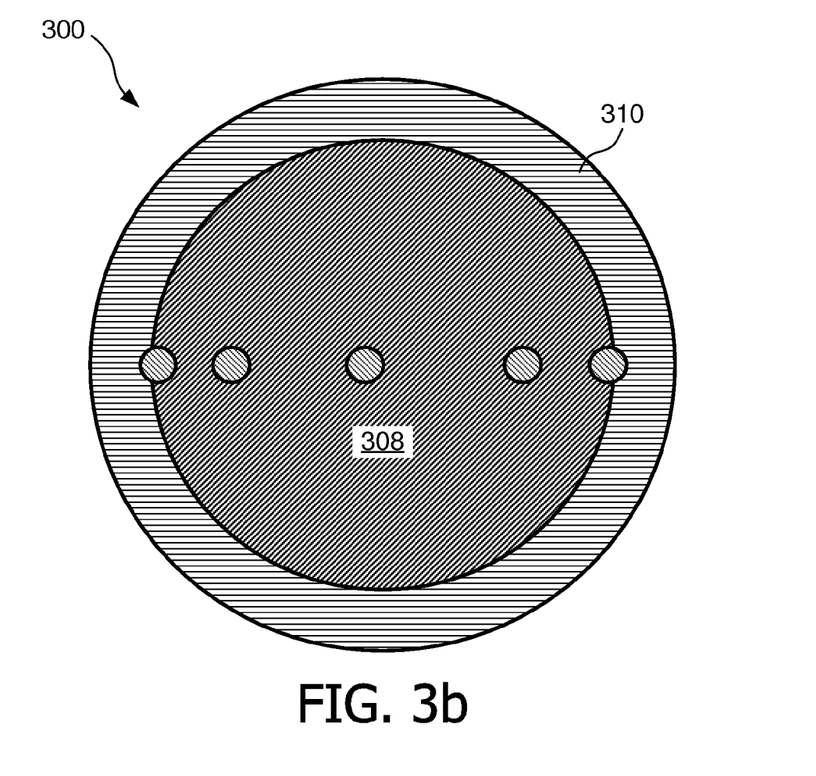

FIG. 3a shows another embodiment of the zero heat flux temperature sensing device 300. FIG. 3a shows a cross-cut of the zero heat flux temperature sensing device 300. FIG. 3b shows a cross-cut of the zero heat flux temperature sensing device at line AA' of FIG. 3a and the view of the cross-cut is taken from a direction that is indicated by the arrow in FIG. 3a.

The zero heat flux temperature sensing device 300 has a cylindrical shape, as seen in FIG. 3a and FIG. 3b, and comprises a thermal insulator 308. At a first side 312 of the thermal insulator 308, the zero heat flux temperature sensing device 300 comprises a first temperature sensor 301, a second temperature sensor 303, a third temperature sensor 311, a first heat flux modulator temperature sensor 304, a second heat flux modulator temperature sensor 309 and a first heat flux modulator 310. The first heat flux modulator 310 has a shape of a ring and is positioned at the border 305 of the first side 312 of the thermal insulator 308. The thermal insulator 308 has a second side 302 opposing the first side 312. The zero heat flux temperature sensing device 300 has a second heat flux modulator 307 and a fourth temperature sensing device 306 at the second side. Although not drawn, it should be noted that the zero heat flux temperature sensing device 300 further comprises a heat flux modulator controller and a safety means.

Figure 4A:
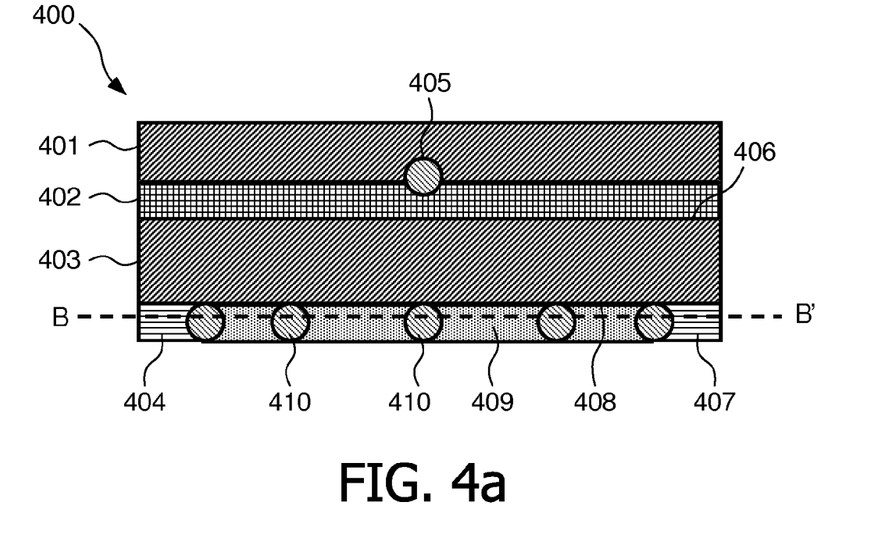
Figure 4B:
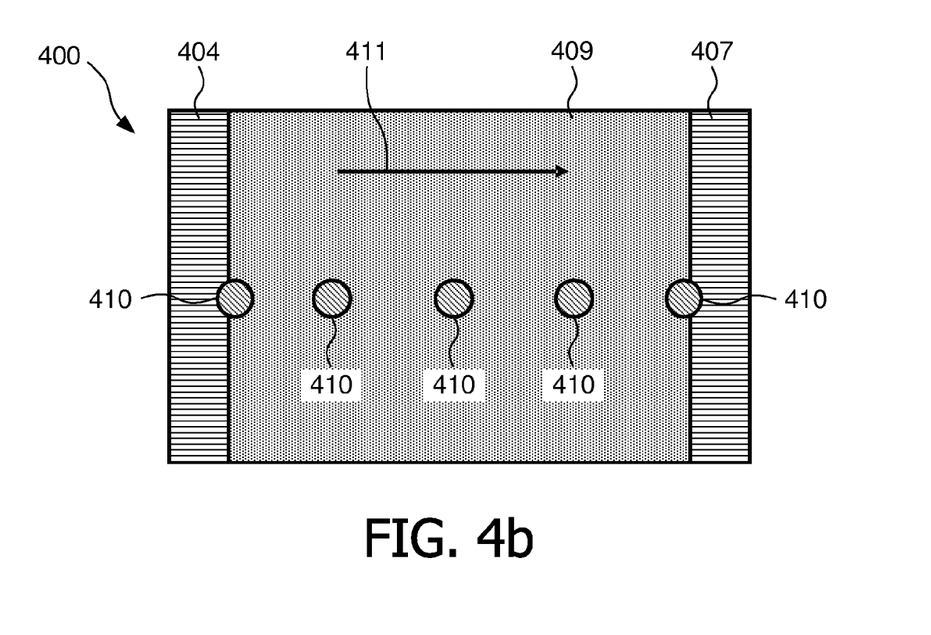

FIG. 4a shows a cross-cut of another embodiment of the zero heat flux temperature sensing device 400. FIG. 4b shows a cross-cut of the zero heat flux temperature sensing device 400 at line BB' of FIG. 4a. The zero heat flux temperature sensing device 400 is a stack of layers. The bottom layer in FIG. 4a has to be positioned against the object of which the core body temperature has to be sensed. The bottom layer comprises a thermal conducting material 409 in which a plurality of temperature sensors 410 is arranged. At a first border of the bottom layer is positioned a first heat flux modulator 404 and at another border is positioned a second heat flux modulator 407. The subsequently layer is a first thermal insulator 403. On top of the first thermal insulator is deposited a third heat flux modulator 402. On top of the third heat flux modulator 402 is positioned a second thermal insulator 401. A third heat flux modulator temperature sensor 405 is arranged at the contact area between the second thermal insulator 401 and the third heat flux modulator 402.

A first temperature difference between the third heat flux modulator temperature sensor 405 and at least one of the plurality of temperature sensors 410 is a measure for the heat flux in a first direction from the bottom layer towards the third heat flux modulator 402. The first temperature difference is used to control the third heat flux modulator 402 in order to reduce the absolute value of the temperature difference. If, in use, the first temperature difference between the third heat flux modulator temperature sensor 405 and the plurality of temperature sensors 410 is close to zero, or equal to zero, the temperature at the plurality of temperature sensors 410 is close to the core body temperature of the object.

In use, if the bottom layer of the zero heat flux temperature sensing device 400 is brought in contact with the surface of the object, the thermal conducting material 409 exchanges heat with the surface of the object and becomes subject to, as discussed in the embodiment of FIG. 1, second temperature differences in a second direction as indicated by the arrow 411. The plurality of temperature sensors 410 sense the second temperature differences between the respective positions of the temperature sensors 410. If the temperature close to the first heat flux modulator 404 or the second heat flux modulator 407 deviates from the temperature at the center of the thermal conducting material 409, the controller (not shown) of the zero heat flux temperature sensing device 400 instructs the first heat flux modulator 404 or the second heat flux modulator 407 to add heat or extract heat such that the absolute value of the measured second temperature differences by the plurality of temperature sensors 410 become smaller. If the absolute values of the second temperature differences become smaller, a more uniform temperature distribution in the thermal conducting material 409 is obtained and, consequently, the core body temperature of the object is sensed more accurately.

The thermal insulator 401 deposited on top of the third heat flux modulator 402 has the function to prevent unnecessary heat losses to the ambient of the zero heat flux temperature sensing device 400. By insulating the third heat flux modulator 402, most of the heat that is added or extracted by the third heat flux modulator 402 is used to influence the heat flux from the bottom of the sensing device 400 towards the third heat flux modulator 402. It results in a more efficient zero heat flux temperature sensing device 400.

It should be noted that the shape of the zero heat flux temperature sensing device 400 may be different in other embodiments. The shape is not limited to the shapes as drawn in FIG. 3b and FIG. 4b. Other possible shapes of the first side are, for example, a square, an ellipse, or a polygon.

Figure 5:
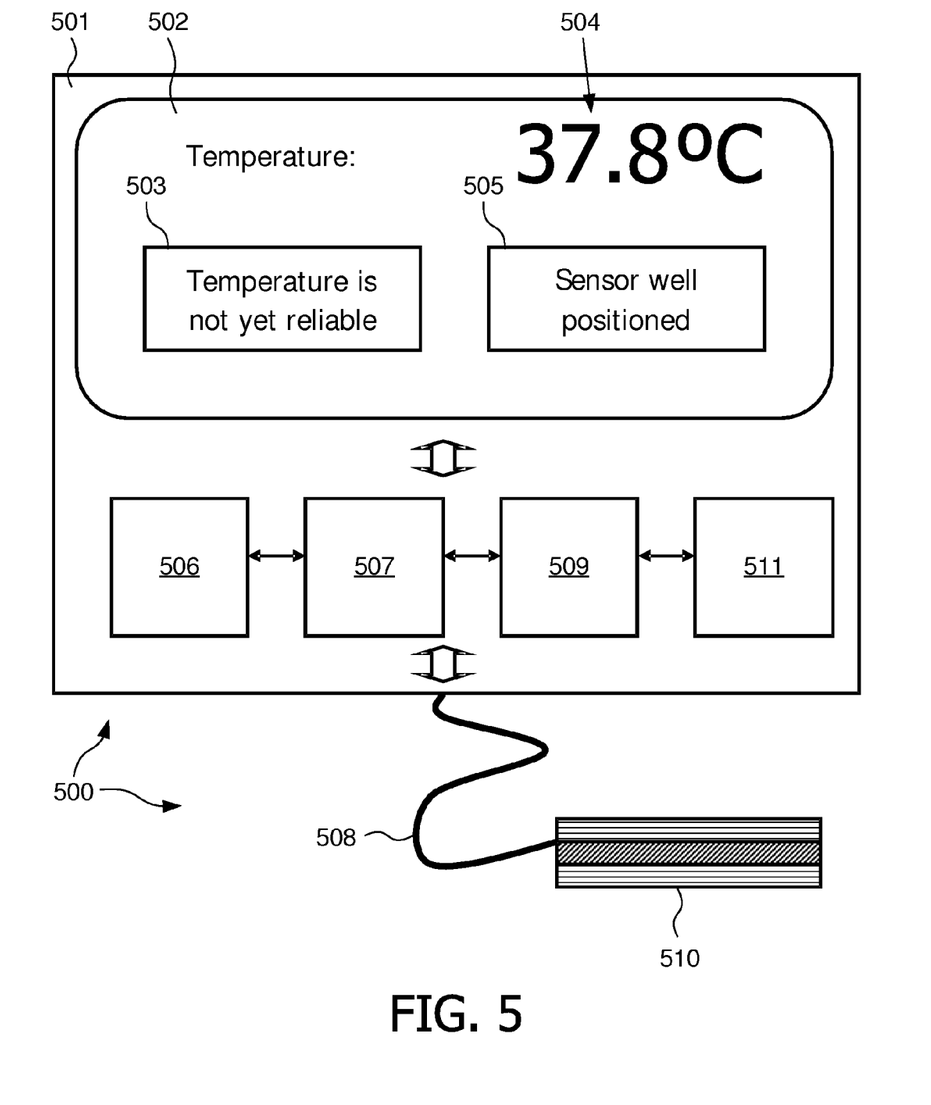

FIG. 5 shows another embodiment of the zero heat flux temperature sensing device 500. The zero heat flux temperature sensing device 500 consists of two parts, a first part and a second part. The first part and the second part are connected via a wire 508, or in another embodiment via for example a wireless data connection.

The first part is a control and feedback means 501 of the zero heat flux temperature sensing device 500. The second part is a sensing means 510 of the zero heat flux temperature sensing device. In use, the sensing means 510 is brought in contact with an object of which the core body temperature has to be measured. The sensing means 510 comprises, for example, temperature sensors, heat flux modulators and thermal insulators. In use, the control and feedback means 501 may be positioned close to the object of which the core body temperature is measured. In another embodiment, in case that the sensing means 510 and the control and feedback means 501 communicate via a wireless data communication link, the control and feedback means 501 may be positioned remotely at a location where for example a medical expert remotely monitors a patient.

The control and feedback means 501 comprises a display 502. On the display 502 is shown which temperature 504 is measured at the first side of the sensing means 510. The first side of the sensing means 510 is a side of the sensing means 510 that is closest to the object of which the core body temperature is measured. The display 502 further shows in a message 503 whether the displayed temperature 504 reliably represents the core body temperature. In the example of FIG. 5 the message 503 is displayed italic because it is better for the user to know that the measure temperature is not yet reliable. Displaying the message in an italic font draws extra attention on the message. If the message 503 indicates that the temperature is reliable, the message 503 is displayed in a normal font. Other ways to display the "not yet reliable" message 503 is displaying the message 503 in, for example, another color. Another message 505 is displayed on the display 502 which provides feedback to the user about the positioning of the sensor. In the example of FIG. 5 the sensor is well positioned against the surface of the object.

The control and feedback means further comprises a heat flux modulator controller 506, a deciding means 507, a thermal mass detector 509 and a safety means 511. These subsystems of the control and feedback means 501 are in communication with each other, provide the display 502 with signals for presenting information on the display, and are in communication with the sensing means 510.

The heat flux modulator controller 506 controls the heat flux modulators of the sensing means 510 in order to reduce the measured temperature differences in the sensing means 510 in a first and a second direction. The heat flux modulator controller 506 receives from the sensing means 510 the measured temperatures which are used to control the addition of heat and the extraction of heat by the heat flux modulators of the sensing means 510.

The deciding means 507 decides on basis of measured temperatures and/or on basis of measured heat fluxes in the sensing means 510 whether the measured temperate 504 is a reliable representation of the core body temperature of the object. The deciding means 507 detects whether a thermal equilibrium is obtained between the sensing means 510 and the object. In an embodiment of the deciding means 507, the deciding means 507 calculates an average temperature of a number of predefined sensed temperatures at the first side of the sensing means 510. The currently measured temperature at the first side of the sensing means 510 is compared with the calculated average temperature. If the currently measured temperature does not deviate more than a predefined first threshold value from the currently sensed temperature, it is decided that the currently sensed temperature at the first side of the sensing device 510 is a reliable measure of the core body temperature of the object. In another embodiment of the deciding means 507, the currently sensed temperature is seen as a reliable core body temperature if the measured temperature difference(s) in the first or/and the second direction is/are smaller than a predefined second threshold value. In yet another embodiment of the deciding means 507, the currently sensed temperature at the first side of the sensing means 510 is confirmed to be reliable if the sensing device 510 is longer in use than a predefined time period, for example, 20 minutes.

It should be noted that the above embodiments of the deciding means 507 may combined as well.

The result of the decision of the deciding means 507 is used to control the message 503 on the display 502.

The thermal mass detector 509 is for detecting the presence of a thermal mass at the first side of the sensing means 510. The thermal mass detector 509 influences, on basis of a modulation signal, the control signal of one or more of the heat flux modulators of the sensing devices to obtain a modulated heat flux at the first side of the sensing means 510. Inside the sensing means 510 the modulated signal is transferred as modulated heat towards the temperature sensors of the sensing means 510. The temperature(s) sensed by one or more of the temperature sensors of the sensing means 510 is analyzed in order to detect the presence of the modulation signal in the sensed temperature signal(s). Based on the presence of the modulation signal in the sensed temperature signal(s) a thermal resistance is estimated. If the sensing means 510 is brought in contact with an object, which acts as a thermal mass, the thermal resistance is higher than the thermal resistance in a situation in which the sensing device 510 is not in contact with the object. If the estimated thermal resistance is higher than a predefined threshold thermal resistance, a thermal mass is detected. The result of the detection is used to display the message 505 on the display 502 regarding the correct positioning of the sensing device 510 against the object.

FIG. 4b is used to explain more in detail the detection of a thermal mass. The thermal mass detector 509 may modulate the addition of heat or the extraction of heat of the first heat flux modulator 404 on basis of a sinusoidal signal. Consequently, the most left positioned temperature sensor of the plurality of temperature sensors 410 senses a first temperature signal with a sine component. The sine of first sensed temperature signal will have a first amplitude and it is expected that the sine of the first sensed temperature signal is in phase with the sinusoidal modulation signal because the most left temperature sensor is positioned adjacent to the first heat flux modulator 404. In the absence of a thermal mass, the center temperature sensor of the plurality of temperature sensors senses a second temperature signal with a sine component. The amplitude of the sine of the second temperature signal is lower than the sine of the first temperature signal as the result of a thermal resistance between the first heat flux modulator 404 and the center temperature sensor. The signals are probably slightly out of phase, because of the time delay between the addition of the heat by the first heat flux modulator 404 and the arrival of the heat at the position of the center temperature sensor.

If the first side of the zero heat flux temperature sensing device 400 is brought in contact with an object, the object acts as a thermal mass. A significant portion of the heat that is added by the first heat flux modulator 404 flows into the object, and a sub-portion of the portion may flow through the object in the direction of the center temperature sensor via a longer path as the direct path through the heat conducting material 409. Consequently, the center temperature sensor receives less heat from the first heat flux modulator 404 in comparison to the situation at which the zero heat flux temperature sensing device 400 was not in contact with the object, and the time delay between the addition of the heat and the arrival of the heat at the center temperature sensor may be longer. In this situation the second temperature signal has a sine component with a lower amplitude and is more out of phase with the modulation signal. Detecting that the amplitude is lower and that the signal is more out of phase is the basis of deciding that the thermal mass is present at the first side.

In other embodiments the modulation signal is another type of signal, like for example a square wave, a saw tooth, a pulse-with-modulated wave, or a pseudorandom sequence. In other embodiments other methods are used to detect the presence of the modulation signal in the signal of the temperature sensors. Examples of solutions to detect a signal in noise are In-Phase/Quadrature synchronous detection, a matched filter, a frequency domain analysis (FFT or DCT), or a single tone extraction.

The safety means 511 of the control and feedback means 501 prevents that the sensing means 510 becomes too hot or too cold. The safety means 511 receives the measured temperature values of the temperatures sensors of the sensing means 510 that are located adjacent to the heat flux modulators of the sensing means 510. If one or more received temperatures are above a first safety threshold value, the safety means 511 instructs the heat flux modulators with a too high temperature to reduce the addition of heat. If one or more received temperatures are below a second safety threshold value, the safety means 511 instructs the heat flux modulators with a too low temperature to reduce the extraction of heat. In another embodiment it is possible that the heat flux modulators with a too high or too low temperature are instructed to switch from heating to cooling, or from cooling to heating, respectively.

In another embodiment of the safety means 511, the safety means 511 analyses the power consumption of the heat flux modulators of the sensing means 510. If one of the heat flux modulators is using too much power, the power provided to the respective heat flux modulator(s) is reduced. Too much power consumption by a heat flux modulator is a sign of, for example, overheating, or locally a too low temperature, or a warning of a short-circuit.

In another embodiment of the safety means 511, the safety means 511 and the heat flux modulator controller 506 are cooperating to prevent the overheating of the heat flux modulators. The parameters of the heat flux modulator controller 506 may be influenced by the safety means such that the control mechanism of the heat flux modulator controller 506 never allows the heat flux modulators becoming too warm or too cold.

It should be noted that combinations of the above embodiment of the safety means may be realized in the zero heat flux temperature sensing device 500 as well.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A zero heat flux temperature sensing device for sensing a core body temperature of an object wherein the zero heat flux temperature sensing device comprises:
    a layer having an opposing first side and second side, wherein, in use, the first side is nearest to the object, and the layer is for obtaining a first temperature difference over the layer in response to a first heat flux in a first direction from the first side to the second side,
    a first temperature gradient sensor for sensing at the first side of the layer a second temperature difference in a second direction, the second direction extends from a first border of the first side towards a second border of the first side,
    a first heat flux modulator, arranged at the first side of the layer and being constructed for changing a second heat flux in the second direction at the first side of the layer to influence the second temperature difference, and
    a heat flux modulator controller for controlling the first heat flux modulator based on the sensed second temperature difference in order to decrease an absolute value of the second temperature difference.

2. A zero heat flux temperature sensing device according to claim 1, wherein the first temperature gradient sensor is for sensing a second temperature difference between the centre of the first side of the layer and the first border or second border of the first side of the layer.

3. A zero heat flux temperature sensing device according to claim 1, wherein the first heat flux modulator is positioned at one of the borders of the first side of the layer.

4. A zero heat flux temperature sensing device according to claim 1,
    wherein the layer has one or more of the following properties:
        the layer has a thermal conductivity that does not deviate more than a factor 10 from the thermal conductivity of a top layer of the object,
        the thermal conductivity of the layer is lower than the thermal conductivity of the top layer of the object,
        the layer is of a flexible material, and/or
        the layer is constructed such that it does not absorb fluids.

5. A zero heat flux temperature sensing device according to claim 1, further comprising:
    a first heat flux modulator temperature sensor arranged adjacent to the first heat flux modulator for sensing the temperature of the first heat flux modulator,
    a safety means for preventing a part of the zero heat flux temperature sensing device becoming warmer than a predefined first safety temperature or a part of the zero heat flux temperature sensing device becoming colder than a predefined second safety temperature, and
    wherein the safety means is constructed for reducing the addition of heat by the first heat flux modulator if the sensed temperature of the first heat flux modulator is higher than the first safety temperature and the safety means is constructed for reducing the extraction of heat by the first heat flux modulator if the sensed temperature of the first heat flux modulator is lower than the second safety temperature.

6. A zero heat flux temperature sensing device according to claim 5, further comprising:
    a second heat flux modulator temperature sensor arranged adjacent to the second heat flux modulator for sensing the temperature of the second heat flux modulator, and
    wherein the safety means is further constructed for reducing the addition of heat by the second heat flux modulator if the sensed temperature of the second heat flux modulator is higher than the predefined first safety temperature and the safety means is constructed for reducing the extraction of heat by the second heat flux modulator if the sensed temperature of the second heat flux modulator is lower than the predefines second safety temperature.

7. A zero heat flux temperature sensing device according to claim 1, further comprising:

a second temperature gradient sensor for sensing the first temperature difference in the first direction, a second heat flux modulator arranged at the second side of the layer and being constructed for changing the first heat flux to influence the first temperature difference, and wherein the heat flux modulator controller is constructed for further controlling the second heat flux modulator on basis of the sensed first temperature difference in order to decrease an absolute value of the first temperature difference.

8. A zero heat flux temperature sensing device according to claim 7, further comprising:
a temperature sensor arranged at the first side of the layer for sensing a temperature at a position at the first side of the layer,
a deciding means for deciding whether the sensed temperature at the first side of the layer is a reliable representation of the core body temperature of the object, and wherein the deciding means is constructed for deciding on basis of one of the subsequent or both of the subsequent criteria:
a currently sensed temperature by the temperature sensor is a reliable representation of the core body temperature of the object if the currently sensed temperature does not deviate more than a first threshold value from the average of a predefined number of previously sensed temperatures by the temperature sensor,
the currently sensed temperature by the temperature sensor is a reliable representation of the core body temperature of the object if an absolute value of a currently sensed first temperature difference and/or the currently sensed second temperature difference is/are smaller than a second threshold value.

9. A zero heat flux temperature sensing device according to claim 8, further comprising:
a means for providing feedback to the user whether the sensed temperature at the first side is a reliable representation of the core body temperature of the object.

10. A zero heat flux temperature sensing device according to claim 1,
wherein the first temperature gradient sensor comprises a first temperature sensor and a second temperature gradient sensor, the first temperature sensor and the second temperature sensor are displaced in the second direction and are constructed for measuring the temperature at the first side of the layer at a respective first position and a respective second position, and
wherein the second temperature sensor is positioned in between the first heat flux modulator and the first temperature sensor.

11. A zero heat flux temperature sensing device according to claim 10, wherein the heat flux controller is constructed for controlling the first heat flux modulator to add heat if the second temperature sensor senses a lower temperature than the first temperature sensor, or to extract heat if the second temperature sensor measures a higher temperature than the first temperature sensor.

12. A zero heat flux temperature sensing device according to claim 10, further comprising:
a third temperature sensor being positioned at the second side of the layer for measuring the temperature at the second side of the layer, and
wherein the second temperature gradient sensor uses the third temperature sensor in combination with the first temperature sensor and/or the second temperature sensor to sense the first temperature difference.

13. A zero heat flux temperature sensing device according to claim 10, further comprising:
a thermal mass detector for detecting the presence of a thermal mass at the first side of the layer on basis of a sensed thermal resistance at the first side of the layer, wherein the thermal mass detector is constructed to decide that a thermal mass is present if the sensed thermal resistance is higher than a predefined threshold thermal resistance, and wherein the thermal mass detector is constructed for sensing the thermal resistance by controlling the first heat flux modulator on basis of a modulation signal to obtain a modulated second heat flux and by analyzing the sensed temperature by the first temperature sensor and/or the second temperature sensor in order to estimate the thermal resistance between the first heat flux modulator and the first temperature sensor and/or the second temperature sensor on basis of the transfer of the modulation signal to the sensed temperature of the first temperature sensor and/or the second temperature sensor.

14. A zero heat flux temperature sensing device according to claim 13, further comprising:
a means for providing feedback to the user about the presence of a thermal mass at the first side of the layer.

15. A body temperature sensing apparatus to measure the core body temperature of an animal or a human being comprising the zero heat flux temperature sensing device according to claim 1.

* * * * *